United States Patent
Biswas et al.

(10) Patent No.: US 9,442,559 B2
(45) Date of Patent: Sep. 13, 2016

(54) EXPLOITING PROCESS VARIATION IN A MULTICORE PROCESSOR

(71) Applicant: Intel Corporation, Santa Clara, CA (US)

(72) Inventors: Arijit Biswas, Holden, MA (US); Michael D. Powell, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 489 days.

(21) Appl. No.: 13/830,157

(22) Filed: Mar. 14, 2013

(65) Prior Publication Data

US 2014/0281610 A1 Sep. 18, 2014

(51) Int. Cl.
*G06F 1/32* (2006.01)

(52) U.S. Cl.
CPC .............. *G06F 1/324* (2013.01); *G06F 1/3296* (2013.01); *Y02B 60/1217* (2013.01); *Y02B 60/1285* (2013.01)

(58) Field of Classification Search
CPC ............ G06F 61/32; G06F 1/32; G06F 1/28; G06F 1/26; G06F 1/00
USPC ....... 713/300, 310, 320, 321, 322, 323, 324, 713/330, 340, 375
See application file for complete search history.

(56) References Cited

U.S. PATENT DOCUMENTS

| | | | |
|---|---|---|---|
| 4,228,496 A | 10/1980 | Katzman et al. | |
| 4,356,550 A | 10/1982 | Katzman et al. | |
| 4,958,273 A | 9/1990 | Anderson et al. | |
| 5,367,697 A | 11/1994 | Barlow et al. | |
| 5,491,788 A | 2/1996 | Cepulis et al. | |
| 5,761,516 A | 6/1998 | Rostoker | |
| 6,141,762 A | 10/2000 | Nicol et al. | |
| 6,407,575 B1 | 6/2002 | Wissell et al. | |
| 6,425,068 B1 | 7/2002 | Vorbach et al. | |
| 6,691,216 B2 | 2/2004 | Kelly et al. | |
| 6,772,189 B1 | 8/2004 | Asselin | |
| 6,826,656 B2 | 11/2004 | Augsburg et al. | |
| 6,928,566 B2 | 8/2005 | Nunomura | |
| 7,111,178 B2 | 9/2006 | Rusu et al. | |
| 7,146,514 B2 | 12/2006 | Kaushik et al. | |
| 7,268,570 B1 | 9/2007 | Audet et al. | |
| 7,398,403 B2 | 7/2008 | Nishioka | |
| 7,463,992 B2* | 12/2008 | Samaan et al. ............... | 702/118 |
| 7,464,276 B2 | 12/2008 | Rusu et al. | |
| 7,565,563 B2 | 7/2009 | Gappisch et al. | |
| 7,596,708 B1* | 9/2009 | Halepete ................... | G06F 1/08 713/322 |
| 7,702,933 B2 | 4/2010 | Tsai | |
| 7,779,287 B2 | 8/2010 | Lim et al. | |
| 7,814,252 B2 | 10/2010 | Hoshaku | |
| 7,882,379 B2 | 2/2011 | Kanakogi | |
| 7,895,453 B2 | 2/2011 | Kasahara et al. | |
| 8,112,754 B2 | 2/2012 | Shikano | |

(Continued)

*Primary Examiner* — Jaweed A Abbaszadeh
*Assistant Examiner* — Keshab Pandey
(74) *Attorney, Agent, or Firm* — Trop, Pruner & Hu, P.C.

(57) ABSTRACT

A disclosed method includes accessing characterization data indicating first and second sets of performance characteristics for first and second processing cores of a processor; determining, based on a performance objective and the characterization data, a first power state for the first processing core and a second power state for the second processing core; and applying the first power performance objective to the first processing core and the second power performance objective to the second processing core.

12 Claims, 5 Drawing Sheets

(56) References Cited

U.S. PATENT DOCUMENTS

| | | |
|---|---|---|
| 8,281,164 B2 | 10/2012 | Kim |
| 8,407,505 B2 | 3/2013 | Asaba |
| 8,417,974 B2 | 4/2013 | Heller, Jr. |
| 2002/0099976 A1 | 7/2002 | Sanders et al. |
| 2002/0120882 A1 | 8/2002 | Sarangi et al. |
| 2002/0147932 A1 | 10/2002 | Brock et al. |
| 2002/0156611 A1 | 10/2002 | Lenormand |
| 2003/0033490 A1 | 2/2003 | Gappisch et al. |
| 2003/0076183 A1* | 4/2003 | Tam .................. G06F 1/3203 331/100 |
| 2004/0015888 A1 | 1/2004 | Fujii et al. |
| 2005/0107967 A1* | 5/2005 | Patel ................ G01R 31/3004 702/64 |
| 2005/0240735 A1 | 10/2005 | Shen et al. |
| 2006/0005056 A1 | 1/2006 | Nishioka |
| 2007/0043964 A1 | 2/2007 | Lim et al. |
| 2007/0174829 A1 | 7/2007 | Brockmeyer et al. |
| 2007/0255929 A1 | 11/2007 | Kasahara et al. |
| 2007/0283128 A1 | 12/2007 | Hoshaku |
| 2008/0022052 A1 | 1/2008 | Sakugawa |
| 2008/0077815 A1 | 3/2008 | Kanakogi |
| 2008/0104425 A1* | 5/2008 | Gunther ............ G06F 1/3203 713/300 |
| 2008/0235364 A1* | 9/2008 | Gorbatov ........... G06F 1/3203 709/224 |
| 2008/0301474 A1 | 12/2008 | Bussa et al. |
| 2009/0049312 A1* | 2/2009 | Min .................. G06F 1/3228 713/300 |
| 2009/0070772 A1 | 3/2009 | Shikano |
| 2009/0165007 A1* | 6/2009 | Aghajanyan ........ G06F 9/4881 718/103 |
| 2009/0222654 A1* | 9/2009 | Hum .................. G06F 13/24 713/100 |
| 2010/0053005 A1 | 3/2010 | Mukai et al. |
| 2010/0058086 A1* | 3/2010 | Lee .................. G06F 1/3203 713/322 |
| 2010/0094572 A1* | 4/2010 | Chase ............... G06F 1/3203 702/57 |
| 2010/0095137 A1* | 4/2010 | Bieswanger ......... G06F 1/3203 713/300 |
| 2010/0146310 A1 | 6/2010 | Kasahara et al. |
| 2010/0169609 A1* | 7/2010 | Finkelstein ......... G06F 1/3203 712/43 |
| 2011/0004774 A1 | 1/2011 | Hansquine et al. |
| 2011/0087909 A1 | 4/2011 | Kanakogi |
| 2011/0119508 A1 | 5/2011 | Heller, Jr. |
| 2011/0173477 A1 | 7/2011 | Asaba |
| 2011/0252267 A1* | 10/2011 | Naveh et al. .................. 713/501 |
| 2012/0042176 A1 | 2/2012 | Kim |
| 2012/0079235 A1 | 3/2012 | Iyer et al. |
| 2012/0144217 A1 | 6/2012 | Sistla et al. |
| 2012/0144218 A1 | 6/2012 | Brey et al. |
| 2012/0146708 A1 | 6/2012 | Naffziger et al. |
| 2012/0324250 A1 | 12/2012 | Chakraborty et al. |
| 2013/0007413 A1* | 1/2013 | Thomson et al. ............. 712/30 |
| 2013/0041977 A1* | 2/2013 | Wakamiya ................ 709/217 |
| 2013/0080795 A1 | 3/2013 | Sistla et al. |
| 2013/0111226 A1 | 5/2013 | Ananthakrishnan et al. |
| 2014/0024145 A1* | 1/2014 | Bickford et al. ............. 438/17 |
| 2014/0189704 A1* | 7/2014 | Narvaez et al. ............ 718/104 |

\* cited by examiner

300

DETERMINE CHARACTERIZATION DATA INDICATING PERFORMANCE CHARACTERISTICS INCLUDING A MAXIMUM FREQUENCY AND A MINIMUM VOLTAGE FOR EACH CORE OF A MULTICORE PROCESSOR 310

STORE PER CORE CHARACTERIZATION DATA IN A NON VOLATILE MEMORY TABLE 320

ACCESS CHARACTERIZATION DATA FROM TABLE 330

IDENTIFY A PERFORMANCE OBJECTIVE 345

DETERMINE PER CORE POWER STATES BASED ON THE CHARACTERIZATION DATA AND PERFORMANCE OBJECTIVE 350

APPLY PER CORE POWER STATES TO THE PROCESSING CORES 360

SCHEDULE PENDING THREADS FOR EXECUTION ON BEST SUITED CORES AND MIGRATE EXECUTING THREADS TO BETTER SUITED CORES AS AVAILABLE 370

FIG. 3

EXPLOITING PROCESS VARIATION IN A MULTICORE PROCESSOR

TECHNICAL FIELD

Embodiments described herein generally relate to microprocessors and, in particular, microprocessors that include multiple processing cores.

BACKGROUND

In order to manage manufacturing variation during fabrication of multicore processors while maintaining quality and reliability, conservative guard bands are employed during testing and devices are "binned" or classified based on their speed and power characteristics. Conventional speed binning treats multicore processors as single-core devices by assigning a single rated speed and minimum operating voltage for the processor as a whole. The rated speed and minimum voltage reflect the speed of the slowest core and the minimum voltage of the core having the poorest minimum voltage.

BRIEF DESCRIPTION OF THE DRAWINGS

FIG. 3 illustrates one embodiment of a method to manage the supply voltage and clock frequency provided to individual cores in a multicore processor;

DESCRIPTION OF EMBODIMENTS

Figure 1:
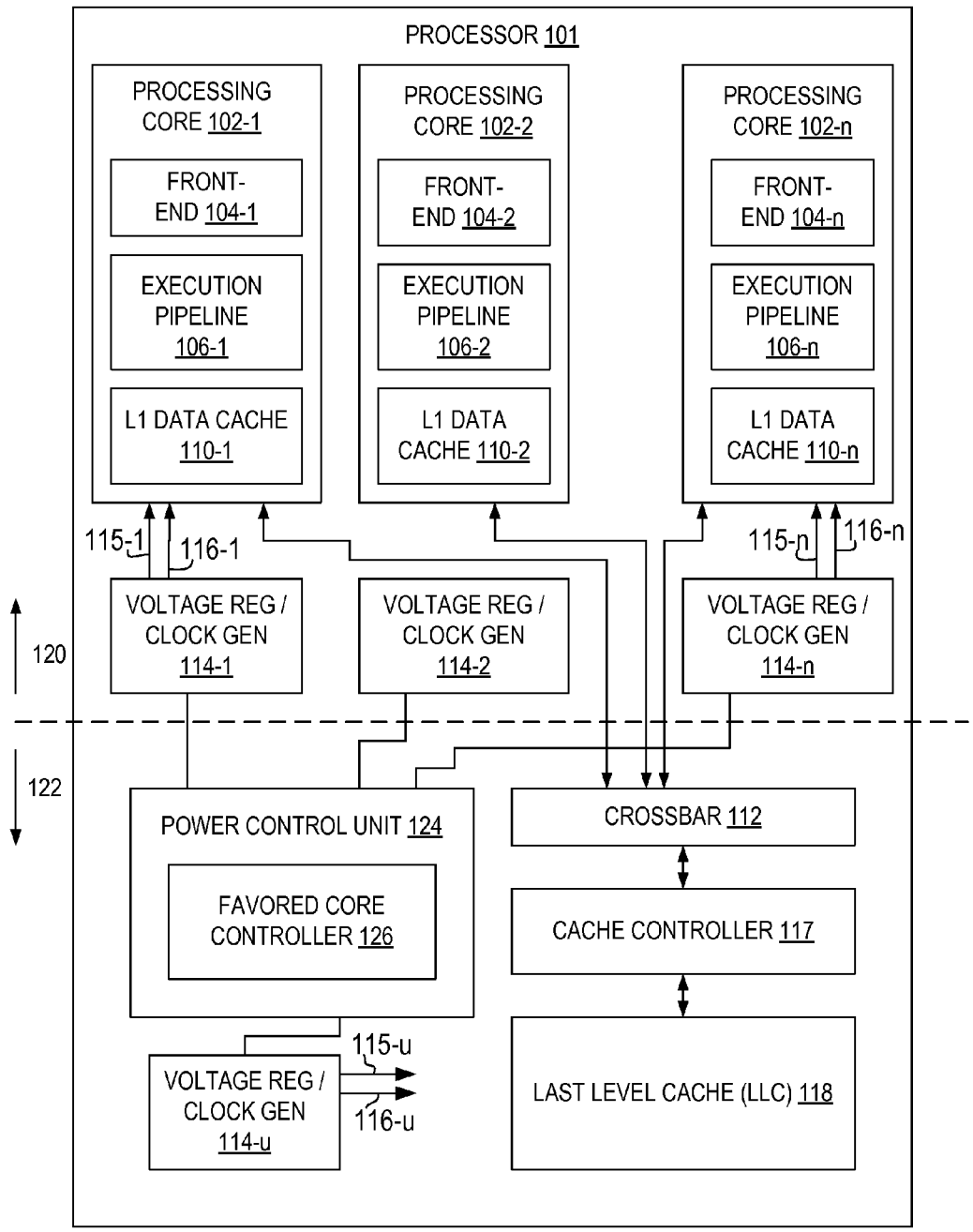
FIG. 1 illustrates a multicore processor used in conjunction with at least one embodiment.

Embodiments described herein pertain to techniques for recognizing and exploiting operational differences resulting from fabrication process variation among individual execution cores of a processor or system by accessing performance characteristics of individual processing cores and allocating processing resources to complete pending tasks based on the performance characteristics of individual cores and one or more desired performance objectives.

In at least one embodiment, the individual cores in a multicore processor are tested or otherwise characterized during fabrication or soon thereafter to obtain characterization data indicative of one or more performance characteristics of the applicable cores. In some embodiments, the performance characteristics that are captured in the characterization data include characteristics indicative of the power consumption and speed of a corresponding processing core.

In at least one embodiment, the characterization data indicates, for each processing core, a maximum clock frequency, obtained when operating at a maximum specified supply voltage, and a minimum supply voltage required to operate at a minimum specified operating frequency, or both. The characterization data may, in some embodiments, be obtained or otherwise determined before the processor is packaged. In some embodiments, the characterization data may be stored in a table, referred to herein as the core physical characteristics table, in a fuse block, or in other non-volatile storage within or otherwise accessible to the processor.

In at least one embodiment, a multicore processor includes a power control unit (PCU) to access characterization data indicating, for each core, a maximum clock frequency and a minimum voltage. From this characterization data, in some embodiments, a PCU could determine the fastest core, i.e., the core having the highest maximum frequency, and the lowest power core, i.e., the core having the lowest minimum voltage. In some embodiments, the PCU may leverage this characterization information to implement a single-core turbo feature by allocating a single pending thread to the fastest core when speed is a primary objective. The PCU may, in some embodiments, also allocate a single pending thread to the lowest power core when power conservation is a primary objective. In the context of multiple pending threads and multiple processing cores, embodiments of the PCU may extend the turbo feature by allocating a group of threads to the fastest group of processing cores or the lowest power group of operating threads.

In conjunction with these features, embodiments of the PCU may be operable to migrate threads to different cores so that as threads executing on the fastest cores are completed, the PCU may migrate remaining pending threads to faster cores as they become available. If four threads are executing on the four fastest processing cores and the thread executing on the second fastest core completes, the PCU may, in some embodiments, migrate the remaining pending threads executing on the third and fourth fastest cores to execute on the second and third fastest processing cores. The migration may, in these embodiments, include migrating the thread executing on the fourth fastest processing core to the second fastest processing core so that the three remaining threads are executing on the three fastest cores. In at least one embodiment, the PCU is operable to perform an analogous allocation and migration of a group of threads to the lowest power cores that are available at any given time.

In at least one embodiment, the characterization data may further include, for each core, a minimum voltage for each of a defined set of available clock frequencies to create a core characterization matrix that may be consulted to determine core voltage and frequency conditions. If a clock frequency required to complete a specified task is specified, selected, or otherwise imposed on a system, the matrix may, in some embodiments, be consulted to determine which set of processing cores may complete that task at the lowest power. In this manner, the matrix information may allow the PCU to choose the optimal subset of specific cores for operating points that are intermediate between the minimum voltage and maximum frequency performance corners.

In at least one embodiment, the per-core characterization data is exposed to an operating system which may then use the data to make thread scheduling decisions using a task scheduler. In at least one embodiment, the operating system may schedule threads on a favored core and may have the ability to migrate a thread to a different processing core that better achieves a desired objective, transparent to the user.

In at least one embodiment, the processor includes, in addition to multiple processing cores, un-core elements including, without limitation, a crossbar, a last level cache, a cache controller, and an integrated voltage regulator in communication with a favored core controller of a PCU. The crossbar may, in some embodiments, be implemented as an intelligent uncore controller to interconnect processing cores, the last level cache (LLC), and the cache controller. In at least one embodiment, the characterization data includes a set of performance characteristics for the uncore and the PCU determines a power state for the uncore independent of the core power states.

In some embodiments, a disclosed microprocessor system identifies favored cores to achieve a desired processing objective that may include a performance component, a power consumption component, or both. In at least one embodiment, the system includes a processor and storage, accessible to the processor, to store all or portions of an operating system. Depending upon a platform for which the system is targeted, the operating system may include additional features including, in some embodiments, operating system support for a touch screen interface, a processor-executable resume module including executable instructions to reduce latency associated with transitioning from a power conservation performance objective, and a processor-executable connect module including instructions to maintain a currency of a dynamic application during the power conservation performance objective.

In at least one embodiment, a processor in the system includes multiple processing cores and an uncore that includes an LLC, a cache controller, a crossbar or other form of inter-core interconnect, and a PCU. In at least one embodiment, the PCU includes a favored core controller to access characterization data indicating, for each processing core and for the uncore, performance characteristics including a maximum frequency at a fixed maximum voltage and a minimum voltage at a fixed minimum frequency.

In at least one embodiment, the PCU accesses the characterization data from a core physical characteristics table and determines a power state for each independently controllable power domain based on the characterization data and a desired performance-power objective. As used herein, a power state refers to the combination of supply voltage and clock signal frequency that represents the primary determinants of performance and power consumption for a given core executing a given sequence of instructions. In some embodiments, the uncore and each individual processing core are associated with their own power domains. In other embodiments, the processing cores may share one power domain while the uncore has its own power domain. In some embodiments, when the desired performance power objective is low power operation, a PCU may select per-core power states emphasizing reduced power consumption by powering each core at the minimum voltage indicated for each core in the characterization data. Conversely, in some embodiments, the PCU may select per-core performance objectives emphasizing speed or performance by selecting power states that operate each core at the maximum voltage and clocking each core at the maximum frequency indicated for each core in the characterization data. In conjunction with voltage regulation and clock generation hardware associated with each power domain, embodiments of the PCU implement the determined power states for each domain.

In the following description, details are set forth in conjunction with embodiments to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, widget 12-1 refers to an instance of a widget class, which may be referred to collectively as widgets 12 and any one of which may be referred to generically as a widget 12.

FIG. 1 illustrates a multicore processor used in conjunction with at least one embodiment. In at least one embodiment, processor 101 includes a core region 120 and an uncore 122. In some embodiments, core region 120 includes multiple processing cores 102, but disclosed functionality may be applicable to single core processors in a multiprocessor system. In some embodiments, processor 101 includes a first processing core 102-1, a second processing core 102-2, and so forth through an n-th processing core 102-*n*.

In some embodiments, processing cores 102 include sub-elements or clusters that provide different aspects of overall functionality. In some embodiments, processing cores 102 include a front-end 104, an execution pipeline 106, and a first level (L1) data cache 110. In at least one embodiment, front-end 104 is operable to fetch instructions from an instruction cache (not depicted) and schedule the fetched instructions for execution. In some embodiments, execution pipeline 106 decodes and performs various mathematical, logical, memory access, and flow control instructions in conjunction with a register file (not depicted) and L1 data cache 110. Thus, in some embodiments, front-end 104 may be responsible for ensuring that a steady stream of instructions is fed to execution pipeline 106 while execution pipeline 106 may be responsible for executing instructions and processing the results. In some embodiments, execution pipeline 106 may include two or more arithmetic pipelines in parallel, two or more memory access or load/store pipelines in parallel, and two or more flow control or branch pipelines. In at least one embodiment, execution pipelines 106 may further include one or more floating point pipelines. In some embodiments, execution pipelines 106 may include register and logical resources for executing instructions out of order, executing instructions speculatively, or both.

In at least one embodiment, during execution of memory access instructions, execution pipeline 106 attempts to execute the instruction by accessing a copy of the applicable memory address residing in the lowest level cache memory of a cache memory subsystem that may include two or more cache memories arranged in a hierarchical configuration. In at least one embodiment, a cache memory subsystem includes the L1 data caches 110 and an LLC 118 in the uncore 122. In at least one embodiment, other elements of the cache memory subsystem may include a per-core instruction cache (not depicted) that operates in conjunction with front end 104 and one or more per-core intermediate caches (not depicted). In at least one embodiment, the cache memory subsystem for processor 101 includes L1 data and instruction caches per-core, an intermediate or L2 cache memory per-core that includes both instructions and data, and the LLC 118, which includes instructions and data and is shared among multiple processing cores 102. In some embodiments, if a memory access instruction misses in the L1 data cache, execution of the applicable program or thread may stall or slow while the cache memory subsystem accesses the various cache memories until a copy of the applicable memory address is found.

In at least one embodiment, processor 101, first processing core 102-1, second processing core 102-2 and processing core 102-*n* communicate via a crossbar 112, which may support data queuing, point to point protocols, and multicore interfacing. Other embodiments of processor 101 may employ a shared bus interconnect or direct core-to-core interconnections and protocols. In at least one embodiment, crossbar 112 serves as an uncore controller that interconnects processing cores 102 with LLC 118. In some embodiments, uncore 122 includes a cache controller 117 to implement a cache coherency policy and, in conjunction with a memory controller (not depicted), maintain coherency between a system memory (not depicted) and the various cache memories.

In at least one embodiment, PCU 124 includes a favored core controller (FCC) 126 to determine individual power states for cores 102 based on a performance-power objective and individual performance characteristics of the various cores 102. In some embodiments, the performance characteristics of individual cores 102 may be indicated in a core physical characteristics table or another data structure located in or accessible to processor 101. In at least one embodiment, core region 120 includes, in addition to processing cores 102, voltage regulator/clock generator (VRCG) circuits 114 for each core processor 102. In some embodiments, in conjunction with per-core supply voltage signals 115 and clock frequency signals 116 generated by PCU 124 and provided to each core 102, VRCG circuits 114 support per-core power states by applying a power state indicated by the applicable supply voltage signal 115 and clock frequency signal 116 to the applicable core 102, as well as to uncore 122.

At least some embodiments of PCU 124 are further operable to select processing cores 102 for execution of specific threads and to migrate a thread and its corresponding performance objective or context information from a first core, e.g., first core 102-1, to a second core, e.g., second core 102-2, when the performance characteristics of second core 102-2 make second core 102-2 better suited to achieve a desired power-performance objective than first core 102-1.

In some embodiments, processor 101 may include a hybrid assortment of cores including, in addition to processing cores, graphics cores and other types of core logic. In these hybrid core embodiments, the core physical characteristics table indicates maximum frequency and minimum voltage characteristics for each type and instance of a core element and PCU 124 determines an optimal or desirable power state, not only for processing cores 102, but also for these other types of core elements in core region 120. Similarly, in at least one embodiment, processor 101 includes a VRCG circuit 114-$u$ that provides the power state for uncore 122 and, in this embodiment, the core physical characteristics table may include characteristic data for uncore 122 and PCU 124 may determine the optimal or preferred power states for uncore 122. Thus, in some embodiments, processor 101 supports individualized power states for each core 102, any other types of cores in core region 120, and uncore 122. Other embodiments may support one power state for an entire core region 120 and one power state for uncore 122.

Figure 2:
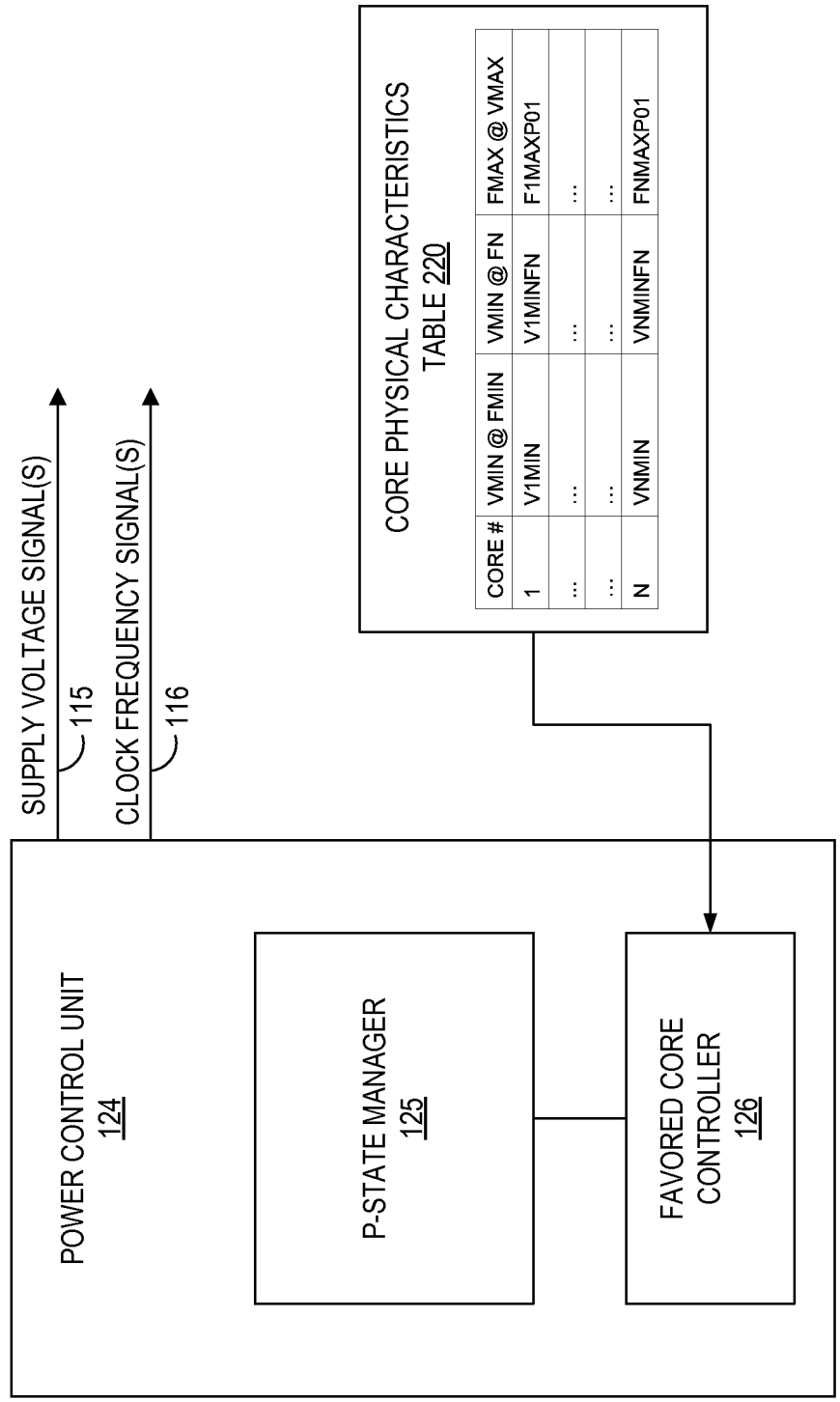
FIG. 2 illustrates a power control unit in a multicore processor used in conjunction with at least one embodiment.

FIG. 2 illustrates a power control unit in a multicore processor used in conjunction with at least one embodiment. In at least one embodiment, PCU 124 includes a power state manager 125 that operates in conjunction with FCC 126 to determine an optimal or desirable power state for individual cores in a multicore processor based on core-specific performance characteristics of the individual cores and an operational input is presented. In some embodiments, PCU 124 generates instances of a supply voltage signal 115 and a clock frequency signal 116 to indicate corresponding power states. In some embodiments, power state manager 125 controls various standby or other low power modes that processor 101 may support, but also works in conjunction with FCC 126 to define power states per core and uncore.

In at least one embodiment, FCC 126 is operable to read characterization data stored in a core physical characteristics table (CPCT) 220. In some embodiments, CPCT 220 may be stored in a fuse block (not depicted explicitly) or other non-volatile storage within or accessible to processor 101. In at least one embodiment, CPCT 220 includes a table with one row or entry for each core and one or more columns for each of various performance characteristics of the applicable core. In at least one embodiment, CPCT 220 indicates, in addition to the minimum voltage (VMIN @ FMIN) and the maximum frequency (FMAX @ VMAX), one or more columns indicating a minimum voltage at one or more intermediate clock frequencies (VMINFN). In some embodiments, CPCT 220 conveys, in addition to the minimum voltage and maximum frequency corners of a core's power-performance window, minimum voltage values for clock signal frequencies intermediate between the minimum and maximum frequencies.

FIG. 3 illustrates one embodiment of a method to manage the supply voltage and clock frequency provided to individual cores in a multicore processor. In at least one embodiment, method 300 includes determining (operation 310) a set of performance characteristics, including a maximum frequency and a minimum voltage, for each core of a multicore processor. In some embodiments, the characterization data may be obtained during testing or other functional verification of processor 101 that occurs at the time of fabrication, typically, but not necessarily after the point at which the wafer is sawed into individual die or devices.

In at least one embodiment, method 300 includes storing (operation 320) the characterization data in CPCT 220 or a different table or data structure of non-volatile memory located in or accessible to processor 101. During processor operation, in at least one embodiment, method 300 includes accessing (operation 330) characterization data from CPCT 220. In some embodiments, after reading or otherwise obtaining or accessing the characterization data, message method 300 identifies (operation 345) a performance objective. In at least one embodiment, the identified performance objective may be indicated by one or more status bits stored in one or more status registers or configuration registers.

The performance objectives identified in operation 345 may, in some embodiments, indicate low-power operation as a desired objective, high performance or fast operation as an objective, or a combination thereof. In at least one embodiment of PCU 124, when the performance objective indicated represents either of the two operating corners of the corresponding core, FCC 126 may signal the power state manager 125 accordingly based on the operating corners indicated in CPCT 220. In some embodiments, when the performance objective indicates a combination of power consumption and performance, FCC 126 may determine a power state not explicitly represented in CPCT 220 by performing linear or non-linear interpolation between the operating corners or other representations of power states that are explicitly indicated in CPCT 220. In at least one embodiment, when CPCT 220 includes characteristic data for power performance objectives intermediate between the minimum voltage corner and the maximum frequency corner, the indication of intermediate power state data may be fulfilled by retrieving one of the intermediate columns of CPCT 220.

In at least one embodiment, method 300 further includes determining (operation 350) individualized power states for individual cores based on the characterization data and the identified performance objective. In addition to determining the individualized power states, in some embodiments, method 300 further includes applying (operation 360) the power states to the corresponding cores. In at least one embodiment, method 300 further includes scheduling (operation 370) an individual thread for execution on a specified core that is best suited to achieve the performance objective and migrating an executing thread from a first core to a better suited core when the better suited core indicates availability according to the identified performance objectives (i.e., scheduling and migrating of currently executing cores to faster cores, in the case of a performance-based operation objective, and scheduling and migrating threads to lower power cores, in the case of a power based performance objective). The applying represented in operation 360 may, in some embodiments, include ensuring that, when less than all core resources are being utilized, the threads that are being executed are allocated to or migrated to the subset of cores best able to achieve the applicable performance objective. If the performance objective emphasizes low-power and less than all processing cores are currently executing threads, the PCU is operable, in some embodiments, to migrate the still executing threads to the processing cores that have the best power consumption characteristics. Moreover, while in some embodiments, method 300 suggests execution by operating system code, other embodiments may expose the core physical characteristics table to an application program through an application programming interface to enable application programs to access and utilize the characterization data to influence power state management.

In some embodiments, the characterization data may be exposed so that an application program could monitor the current operating condition, and, based upon core characteristic information, provide key performance objective recommendations to the operating system.

Figure 4:
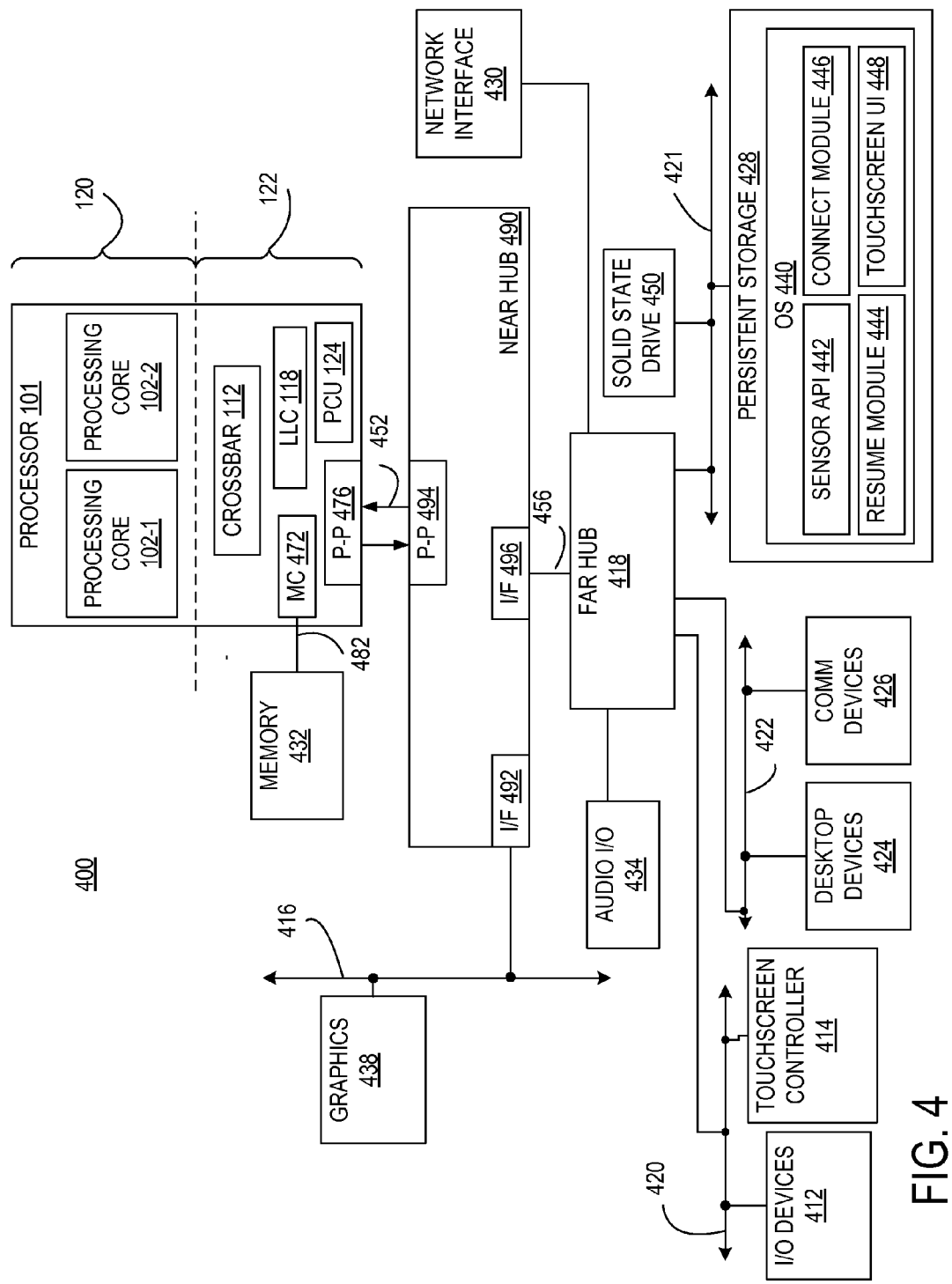
FIG. 4 illustrates a computer system used in conjunction with at least one embodiment.

Embodiments may be implemented in many different platforms. FIG. 4 illustrates a computer system used in conjunction with at least one embodiment. In at least one embodiment, a processor, memory, and input/output devices of a processor system are interconnected by a number of point-to-point (P-P) interfaces, as will be described in further detail. However, in other embodiments, the processor system may employ different bus architectures, such as a front side bus, a multi-drop bus, and/or another implementation. Although a processor is shown in in FIG. 4 for descriptive clarity, in various embodiments, a different number of processors may be employed using elements of the illustrated architecture.

In at least one embodiment, system 400 is a point-to-point interconnect system, and includes processor 101. While in some embodiments system 400 may include only a single processor, in other embodiments, system 400 may support multiple processors. In at least one embodiment, processor 101 is a multicore processor including first processing core 102-1 and second processing core 102-2. It is noted that other elements of processor 101 besides processing cores 102 may be referred to as an uncore 122, while processing cores 102 may also be referred to as core region 120. In different embodiments, a varying number of cores may be present in a particular processor. In at least one embodiment, processing cores 102 may comprise a number of sub-elements (not shown in FIG. 4), also referred to as clusters, that provide different aspects of overall functionality. Processing cores 102 may, in some embodiments, each include a memory cluster (not shown in FIG. 4) that may comprise one or more levels of cache memory. In some embodiments, other clusters (not shown in FIG. 4) in processing cores 102 may include a front-end cluster and an execution pipeline cluster. In at least one embodiment, processing cores 102 may include an L1 data cache. In some embodiments, uncore 122 may include crossbar 112, LLC 118, memory controller (MC) 472, PCU 124 and P-P interface 476. In some embodiments, PCU 124 may be used to select a specific core based on the individual characteristics of each core on the die and the requirements of the task.

In particular embodiments, processing cores 102 within processor 101 are not equipped with direct means of communicating with each other, but rather, communicate via crossbar 112, which may include intelligent functionality such as cache control, data queuing, P-P protocols, and multicore interfacing. In some embodiments, crossbar 112 may thus represent an intelligent uncore controller that interconnects processing cores 102 with MC 472, LLC 118, and P-P interface 476, among other elements. In particular, to improve performance in such an architecture, cache controller functionality within crossbar 112 may, in some embodiments, enable selective caching of data within a cache hierarchy including LLC 118 and one or more caches present in processing cores 102. In at least one embodiment, crossbar 112 is referred to as a global queue.

In at least one embodiment, LLC 118 may be coupled to a pair of processor processing cores 102, respectively. In some embodiments, LLC 118 may be shared by processing core 102-1 and processing core 102-2. In some embodiments, LLC 118 may be fully shared such that any single one of processing cores 102 may fill or access the full storage capacity of LLC 118. Additionally, in some embodiments, MC 472 may provide for direct access by processor 101 to memory 432 via memory interface 482. In some embodiments, memory 432 may be a double-data rate (DDR) type dynamic random-access memory (DRAM) while memory interface 482 and MC 472 comply with a DDR interface specification. In at least one embodiment, memory 432 may represent a bank of memory interfaces (or slots) that may be populated with corresponding memory circuits for a desired DRAM capacity.

In some embodiments, processor 101 may also communicate with other elements of system 400, such as near hub 490 and far hub 418, which are also collectively referred to as a chipset that supports processor 101. In at least one embodiment, P-P interface 476 may be used by processor 101 to communicate with near hub 490 via interconnect link 452. In certain embodiments, P-P interfaces 476, 494 and interconnect link 452 are implemented using Intel QuickPath Interconnect architecture.

In at least one embodiment, near hub 490 includes interface 492 to couple near hub 490 with first bus 416, which may support high-performance I/O with corresponding bus devices, such as graphics 438 and/or other bus devices. In some embodiments, graphics 438 may represent a high-performance graphics engine that outputs to a display device (not shown in FIG. 4). In at least one embodiment, first bus 416 is a Peripheral Component Interconnect (PCI) bus, such as a PCI Express (PCIe) bus and/or another computer expansion bus. In some embodiments, near hub 490 may also be coupled to far hub 418 at interface 496 via interconnect link 456. In certain embodiments, interface 496 is referred to as a south bridge. Far hub 418 may, in some embodiments, provide I/O interconnections for various computer system peripheral devices and interfaces and may provide backward compatibility with legacy computer system peripheral devices and interfaces. Thus, in at least one embodiment, far hub 418 provides network interface 430 and audio I/O 434, as well as, provides interfaces to second bus 420, third bus 422, and fourth bus 421, as will be described in further detail.

In some embodiments, second bus 420 may support expanded functionality for system 400 with I/O devices 412 and touchscreen controller 414, and may be a PCI-type computer bus. In at least one embodiment, third bus 422 may be a peripheral bus for end-user consumer devices, represented by desktop devices 424 and communication devices 426, which may include various types of keyboards, computer mice, communication devices, data storage devices, bus expansion devices, etc. In certain embodiments, third bus 422 represents a Universal Serial Bus (USB) or similar peripheral interconnect bus. In some embodiments, fourth bus 421 may represent a computer interface bus for connecting mass storage devices, such as hard disk drives, optical drives, and disk arrays, which are generically represented by persistent storage 428 that may be executable by processor 101.

In at least one embodiment, system 400 emphasizes a computer system that incorporates various features that facilitate handheld or tablet type of operation and other features that facilitate laptop or desktop operation. In addition, in some embodiments, system 400 includes features that cooperate to aggressively conserve power while simultaneously reducing latency associated with traditional power conservation performance objectives.

In at least one embodiment, system 400 includes an operating system 440 that may be entirely or partially stored in persistent storage 428. In some embodiments, operating system 440 may include various modules, application programming interfaces, and the like that expose to varying degrees various hardware and software features of system 400. In at least one embodiment, system 400 includes a sensor application programming interface (API) 442, a resume module 444, a connect module 446, and a touchscreen user interface 448. In some embodiments, system 400 may further include various hardware/firmware features including a capacitive or resistive touchscreen controller 414 and a second source of persistent storage such as a solid state drive (SSD) 450.

In some embodiments, sensor API 442 provides application program access to one or more sensors (not depicted) that may be included in system 400. In at least one embodiment, sensors that system 400 might have in some embodiments include an accelerometer, a global positioning system (GPS) device, a gyro meter, an inclinometer, and a light sensor. The resume module 444 may, in some embodiments, be implemented as software that, when executed, performs operations for reducing latency when transitioning system 400 from a power conservation performance objective to an operating performance objective. In at least one embodiment, resume module 444 may work in conjunction with SSD 450 to reduce the amount of SSD storage required when system 400 enters a power conservation mode. Resume module 444 may, in some embodiments, flush standby and temporary memory pages before transitioning to a sleep mode. In some embodiments, by reducing the amount of system memory space that system 400 is required to preserve upon entering a low power state, resume module 444 beneficially reduces the amount of time required to perform the transition from the low power state to an operating performance objective. In at least one embodiment, connect module 446 may include software instructions that, when executed, perform complementary functions for conserving power while reducing the amount of latency or delay associated with traditional "wake up" sequences. Connect module 446 may, in some embodiments, periodically update certain "dynamic" applications including email and social network applications, so that, when system 400 wakes from a low power mode, the applications that are often most likely to require refreshing are up to date. In at least one embodiment, touchscreen user interface 448 supports touchscreen controller 414 that enables user input via touchscreens traditionally reserved for handheld applications. In some embodiments, the inclusion of touchscreen support in conjunction with support for communication devices 426 enables system 400 to provide features traditionally found in dedicated tablet devices as well as features found in dedicated laptop and desktop type systems.

Figure 5:
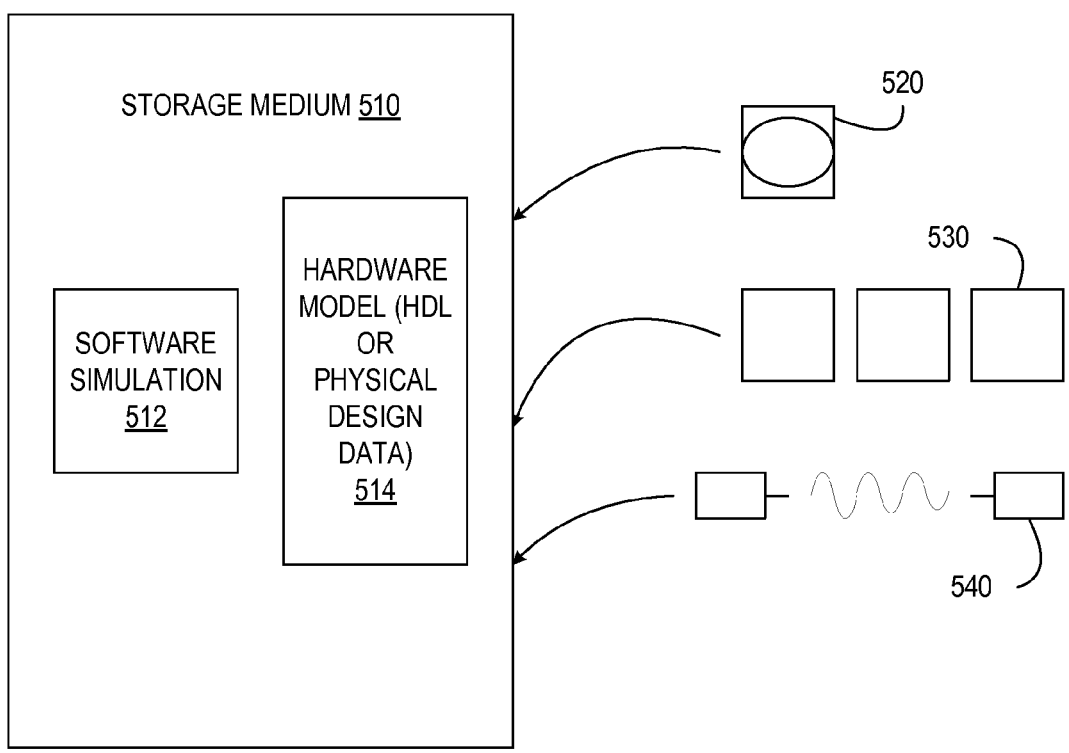
FIG. 5 illustrates a representation for simulation, emulation, and fabrication of a design implementing the disclosed techniques.

FIG. 5 illustrates a representation for simulation, emulation, and fabrication of a design implementing the disclosed techniques. Data representing a design may represent the design in a number of manners. First, as is useful in simulations, the hardware may be represented using a hardware description language or another functional description language which basically provides a computerized model of how the designed hardware is expected to perform. In one In at least one embodiment, hardware model 514 may be stored in a storage medium 510 such as a computer memory so that the model may be simulated using simulation software 512 that applies a particular test suite to the hardware model 514 to determine if it indeed functions as intended. In some embodiments, simulation software 512 is not recorded, captured or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, re-configurable hardware is another embodiment that may involve a tangible machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine readable medium. In some embodiments, an optical or electrical wave 540 modulated or otherwise generated to transmit such information, a memory 530, or a magnetic or optical storage 520 such as a disc, may be the tangible machine readable medium. Any of these mediums may "carry" the design information. The term "carry" (e.g., a tangible machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

The following pertain to further embodiments.

Embodiment 1 is a method for allocating processing resources comprising: (i) accessing characterization data indicating a first set of performance characteristics for a first processing core of a processor; and a second set of performance characteristics for a second processing core of the processor; (ii) determining, based on a performance objective and the characterization data: a first power state for the first processing core; and a second power state for the second processing core; and (iii) applying the first power state to the first processing core and the second power state to the second processing core.

In embodiment 2, the performance characteristics included in the subject matter of embodiment 1 can optionally include a maximum clock frequency (FMAX) attainable at a maximum supply voltage and a minimum supply voltage (VMIN) required for operation at a minimum clock frequency.

In embodiment 3, the subject matter of embodiment 2 can optionally include: (i) identifying a fastest processing core comprising a processing core having a highest value of FMAX; (ii) identifying a lowest power processing core comprising a processing core having a lowest value of VMIN; (iii) preferentially allocating a thread to the fastest processing core when the performance objective includes throughput; and (iv) preferentially allocating the thread to the lowest power processing core when the performance objective includes power conservation.

In embodiment 4, the subject matter of embodiment 2 can optionally include: (i) allocating a first pending thread to a fastest available processing core; (ii) migrating a first executing thread from a present processing core to a faster processing core responsive to the faster processing core indicating availability; (iii) allocating a second pending thread to an available processing core having the lowest value of VMIN; and (iv) migrating a second executing thread from a present processing core to a lower power processing core responsive to the lower power processing core indicating availability.

In embodiment 5, the applying of the first power state to the first processing core included in the subject matter of embodiment 1 can optionally include powering the first processing core at a first supply voltage and clocking the first processing core at a first clock signal frequency; and the applying of the second power state to the second processing core included in the subject matter of embodiment 1 can optionally include powering the second processing core at a second supply voltage and clocking the second processing core at a second clock signal frequency.

In embodiment 6, the subject matter of embodiment 1 can optionally include the first power state selected from a first minimum voltage power state and a first maximum frequency power state.

In embodiment 7, the subject matter of embodiment 1 can optionally include scheduling execution of a thread based on the characterization data.

In embodiment 8, the processor included in the subject matter of embodiment 1 can optionally include an uncore, the characterization data included in the subject matter of embodiment 1 can optionally include an uncore set of performance characteristics for the uncore, and the subject matter of embodiment 1 can optionally include: (i) determining, based on the performance objective and the uncore set of performance characteristics, an uncore power state and (ii) applying the uncore power state to the uncore.

Embodiment 9 is a processor comprising: (i) a plurality of processing cores to execute instructions; (ii) storage to store characterization data indicative of performance characteristics of each of the plurality of processing cores; and (iii) a power control unit (PCU) to: access the characterization data; and control a power state of each processing core to operate at a core specific power and frequency corner indicated by the characterization data.

In embodiment 10, the characterization data included in the subject matter of embodiment 9 can optionally include a maximum frequency and a minimum voltage for each of the plurality of processing cores.

In embodiment 11, the PCU included in the subject matter of embodiment 9 is optionally operable to control a power state of an uncore portion of the processor.

In embodiment 12, the subject matter of embodiment 11 can optionally include a plurality of voltage regulators, accessible to the PCU, each of the plurality of voltage regulators associated with a processing core to provide a core specific supply voltage.

In embodiment 13, the subject matter of embodiment 12 can optionally include an uncore voltage regulator, accessible to the PCU, and associated with the processing core.

In embodiment 14, the plurality of voltage regulators included in the subject matter of embodiment 13 can optionally include clock generators to provide core specific clock signals.

Embodiment 15 is a data processing system comprising: (i) first storage to store performance characterization data; and (ii) a processor, comprising: a plurality of processing cores to execute instructions; and a power control unit (PCU) to: access the performance characterization data; identify a highest frequency processing core and a lowest voltage processing core; control a power state associated with a first processing core to operate at a first power and frequency corner; and control a power state associated with a second processing core to operate at a second power and frequency corner.

In embodiment 16, the first storage included in the subject matter of embodiment 15 optionally comprises non-volatile memory.

In embodiment 17, the subject matter of embodiment 15 can optionally include second storage to store an operating system, and the operating system is operable to schedule threads for execution on a specific processing core based on the performance characterization data.

In embodiment 18, the operating system included in the subject matter of embodiment 17 is optionally operable to migrate a first thread from a first execution core to a second execution core.

In embodiment 19, the system included in the subject matter of embodiment 15 optionally includes voltage regulators associated with each processing core and the PCU is operable to control the voltage regulators to provide supply voltages per processing core.

In embodiment 20, the voltage regulators included in the subject matter of embodiment 19 optionally include clock generators to provide per core clock signals.

In embodiment 21, the subject matter of embodiment 15 can optionally include a voltage regulator and clock generator associated with an uncore region of the processor.

In embodiment 22, the performance characterization data included in the subject matter of embodiment 15 optionally includes maximum frequency data and minimum supply voltage data corresponding to each of the plurality of processing cores.

In embodiment 23, the applying of the first power state to the first processing core included in the subject matter of any one of embodiments 1, 2, 3, or 4 can optionally include powering the first processing core at a first supply voltage and clocking the first processing core at a first clock signal frequency; and the applying of the second power state to the second processing core included in the subject matter of any one of embodiments 1, 2, 3, or 4 can optionally include powering the second processing core at a second supply voltage and clocking the second processing core at a second clock signal frequency.

In embodiment 24, the subject matter of any one of embodiments 9 or 10 can optionally include a plurality of voltage regulators, accessible to the PCU, each of the plurality of voltage regulators associated with a processing core to provide a core specific supply voltage.

In embodiment 25, the system included in the subject matter of any one of embodiments 15 or 16 optionally includes voltage regulators associated with each processing core and the PCU is operable to control the voltage regulators to provide supply voltages per processing core.

In embodiment 26, the subject matter of any one of embodiments 15 or 17 can optionally include a voltage regulator and clock generator associated with an uncore region of the processor.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A non-transitory machine-readable medium having stored thereon data, which if used by at least one machine, causes the at least one machine to fabricate at least one integrated circuit to perform a method comprising:
    accessing characterization data indicating:
        a first set of performance characteristics for a first processing core of a processor, including a minimum voltage for a plurality of available clock frequencies for the first processing core, a maximum clock frequency (FMAX) attainable at a maximum supply voltage, and a minimum supply voltage (VMIN) for operation at a minimum clock frequency; and
        a second set of performance characteristics for a second processing core of the processor, including a minimum voltage for a plurality of available clock frequencies for the second processing core;
    determining, based on a performance objective and the characterization data:
        a first power state for the first processing core; and
        a second power state for the second processing core;
    applying the first power state to the first processing core and the second power state to the second processing core;
    allocating a first pending thread to a fastest available processing core;
    migrating a first executing thread from a present processing core to a faster processing core responsive to the faster processing core indicating availability;
    allocating a second pending thread to an available processing core having the lowest value of VMIN;
    migrating a second executing thread from a present processing core to a lower power processing core responsive to the lower power processing core indicating availability; and
    controlling a power state of an uncore of the processor.

2. The non-transitory machine-readable medium of claim 1, wherein the method further comprises:
    identifying the fastest processing core comprising a processing core having a highest value of FMAX;
    identifying a lowest power processing core comprising a processing core having a lowest value of VMIN;
    preferentially allocating a thread to the fastest processing core when the performance objective includes throughput; and
    preferentially allocating the thread to the lowest power processing core when the performance objective includes power conservation.

3. The non-transitory machine-readable medium of claim 1, wherein:
    applying the first power state to the first processing core includes:
        powering the first processing core at a first supply voltage; and
        clocking the first processing core at a first clock signal frequency; and
    applying the second power state to the second processing core includes:
        powering the second processing core at a second supply voltage; and
        clocking the second processing core at a second clock signal frequency.

4. The non-transitory machine-readable medium of claim 1, wherein the first power state is selected from a first minimum voltage power state and a first maximum frequency power state.

5. The non-transitory machine-readable medium of claim 1, wherein the method further comprises:
    scheduling execution of a thread based on the characterization data.

6. The non-transitory machine-readable medium of claim 1, wherein the characterization data includes an uncore set of performance characteristics for the uncore and wherein the method further comprises:
    determining, based on the performance objective and the uncore set of performance characteristics, an uncore power state; and
    applying the uncore power state to the uncore.

7. A processor, comprising:
    a plurality of processing cores to execute instructions;
    storage to store characterization data indicative of performance characteristics of each of the plurality of processing cores; and
    a power control unit (PCU) to:
        access the characterization data;
        control a power state of one or more of the plurality of processing cores to operate at a core specific power and frequency corner indicated by the characterization data, the characterization data including a minimum voltage for a plurality of available clock frequencies for each of the plurality of processing cores;
        allocate a first pending thread to a fastest available processing core;
        migrate a first executing thread from a present processing core to a faster processing core responsive to the faster processing core indicating availability;
        allocate a second pending thread to an available processing core having the lowest value of a minimum supply voltage (VMIN);
        migrate a second executing thread from a present processing core to a lower power processing core responsive to the lower power processing core indicating availability; and
        control a power state of an uncore portion of the processor.

8. The processor of claim 7, wherein the characterization data includes a maximum frequency and a minimum voltage for each of the plurality of processing cores.

9. The processor of claim 7, further comprising:
a plurality of voltage regulators, accessible to the PCU, each of the plurality of voltage regulators associated with a processing core to provide a core specific supply voltage.

10. The processor of claim 9, wherein the plurality of voltage regulators include clock generators to provide core specific clock signals.

11. The processor of claim 7, wherein the PCU is to determine the power state of the one or more of the plurality of processing cores according to a non-linear interpolation between at least some of the characterization data.

12. The processor of claim 7, further comprising a register to store one or more bits to indicate a performance objective, the PCU to control the power state of the one or more of the plurality of processing cores further based on the performance objective.

* * * * *